United States Patent
Smith

(10) Patent No.: US 9,827,540 B2
(45) Date of Patent: Nov. 28, 2017

(54) CENTRAL ENTRY DUAL ROTOR CAVITATION

(71) Applicant: Highland Fluid Technology, Ltd., Houston, TX (US)

(72) Inventor: Kevin Smith, Bellaire, TX (US)

(73) Assignee: Highland Fluid Technology, Ltd., Houston, TX (US)

( * ) Notice: Subject to any disclaimer, the term of this patent is extended or adjusted under 35 U.S.C. 154(b) by 300 days.

(21) Appl. No.: 14/692,278

(22) Filed: Apr. 21, 2015

(65) Prior Publication Data

US 2015/0328604 A1  Nov. 19, 2015

Related U.S. Application Data

(60) Provisional application No. 62/000,116, filed on May 19, 2014.

(51) Int. Cl.
*B01F 7/00* (2006.01)
*B01F 7/10* (2006.01)
*B01F 7/26* (2006.01)

(52) U.S. Cl.
CPC ...... *B01F 7/00816* (2013.01); *B01F 7/00491* (2013.01); *B01F 7/00641* (2013.01); *B01F 7/10* (2013.01); *B01F 7/26* (2013.01); *B01F 2215/0081* (2013.01); *B01J 2219/00761* (2013.01)

(58) Field of Classification Search
CPC .......... B01F 7/00816; B01F 2215/0081; B01F 7/00491; B01F 7/00641
USPC ................................................ 366/263, 264
See application file for complete search history.

(56) References Cited

U.S. PATENT DOCUMENTS

| 1,061,142 A | 5/1913 | Tesla |
| 3,062,627 A | 11/1962 | Zuiderweg |
| 3,198,191 A | 8/1965 | Wyszomirski |
| 3,487,784 A | 1/1970 | Rafferty et al. |
| 4,335,994 A | 6/1982 | Gurth |
| 4,483,277 A | 11/1984 | Perkins |

(Continued)

FOREIGN PATENT DOCUMENTS

CN  106629995 A  5/2017

OTHER PUBLICATIONS

Petkovsek et al., Rotation generator of hydrodynamic cavitation for water treatment, Separation and Purification Technology 118 (2013), 415-423.

(Continued)

*Primary Examiner* — David Sorkin
*Assistant Examiner* — Anshu Bhatia
(74) *Attorney, Agent, or Firm* — Beck & Thomas, P.C.

(57) ABSTRACT

A method is described of mixing fluid materials, including solids and gases. The materials to be mixed are introduced between two cylindrical rotors mounted in parallel on a motorized shaft. The rotors have arrays of cavities on their cylindrical surfaces and rotate within close proximity to the interior of a cylindrical shell. Passage of the fluid between the rotating rotors and the interior surface of the cylindrical shell causes cavitation, which mixes the materials. The mixture is passed to outlets on the far sides of the rotors from the inlet. Apparatus is described for extending the flow path of the materials and thus increasing exposure to the cavitation process.

7 Claims, 4 Drawing Sheets

(56) References Cited

U.S. PATENT DOCUMENTS

| | | | |
|---|---|---|---|
| 4,483,624 A | * | 11/1984 | Bacon, Jr. ............... B01F 7/169 209/168 |
| 4,514,139 A | | 4/1985 | Gurth |
| 4,768,920 A | | 9/1988 | Gurth |
| 4,773,819 A | | 9/1988 | Gurth |
| 4,779,575 A | | 10/1988 | Perkins |
| 4,940,385 A | | 7/1990 | Gurth |
| 5,188,090 A | | 2/1993 | Griggs |
| 5,385,298 A | | 1/1995 | Griggs |
| 5,419,306 A | | 5/1995 | Huffman |
| 5,931,153 A | | 8/1999 | Giebeler et al. |
| 5,948,326 A | * | 9/1999 | Pate ................... B01F 3/04765 210/242.2 |
| 5,957,122 A | | 9/1999 | Griggs |
| 6,016,798 A | | 1/2000 | Selivanov |
| 6,132,080 A | | 10/2000 | Gurth |
| 6,164,274 A | | 12/2000 | Giebeler et al. |
| 6,315,532 B1 | | 11/2001 | Appleby |
| 6,386,751 B1 | * | 5/2002 | Wootan ................ A01K 63/042 366/170.3 |
| 6,595,759 B2 | | 7/2003 | Crosta et al. |
| 6,596,178 B1 | | 7/2003 | Archibald et al. |
| 6,627,784 B2 | | 9/2003 | Hudson et al. |
| 6,849,175 B2 | | 2/2005 | Kresnyak |
| 6,910,448 B2 | | 6/2005 | Thoma |
| 6,959,669 B2 | | 11/2005 | Thoma |
| 6,976,486 B2 | | 12/2005 | Thoma |
| 7,089,886 B2 | | 8/2006 | Thoma |
| 7,097,416 B2 | | 8/2006 | Gurth |
| 7,201,225 B2 | | 4/2007 | Smith et al. |
| 7,360,755 B2 | | 4/2008 | Hudson et al. |
| 7,553,124 B1 | | 6/2009 | Jimenez |
| 7,736,518 B2 | | 6/2010 | Smith et al. |
| 8,042,989 B2 | | 10/2011 | Gordon et al. |
| 8,430,968 B2 | | 4/2013 | Mancosky et al. |
| 8,597,524 B2 | | 12/2013 | Donnelly |
| 2009/0056645 A1 | | 3/2009 | Hobbs et al. |
| 2011/0095111 A1 | | 4/2011 | Briz et al. |
| 2012/0014779 A1 | | 1/2012 | Gilliam |
| 2012/0291765 A1 | | 11/2012 | Griggs |

OTHER PUBLICATIONS

Steve Kerr, summary of prior art, claim chart, description, photos, and invoices, 2017.

Steve Kerr, email attaching summary of prior art, Oct. 12, 2017.

* cited by examiner

CENTRAL ENTRY DUAL ROTOR CAVITATION

CROSS REFERENCE TO RELATED APPLICATION

This application claims the benefit of U.S. Provisional Application No. 62/000,116 filed May 19, 2014, which is incorporated by reference in its entirety.

TECHNICAL FIELD

A cavitation device especially useful for mixing materials comprises two parallel cylindrical rotors within a housing having an inner surface substantially concentric with the cylindrical surfaces of the rotors, the rotors including a plurality of bores or cavities on their surfaces. In a method of mixing, a fluid inlet to the space between the rotors injects one or more fluid components for mixing, and two outlets remove it after following a flow path through the cavitation zones. The device and method are especially useful for mixing drilling muds, fracturing fluids, and other oil field fluids. One or more optional discs may be deployed in parallel to the rotors to augment the use of viscous drag to turn the rotors and moderate energy consumption while optimizing the desirable cavitation and mixing effects.

BACKGROUND OF THE INVENTION

Cavitation devices of the type disclosed by Griggs (U.S. Pat. Nos. 5,188,090, 5,385,298, and 5,957,122), Hudson et al U.S. Pat. No. 6,627,784, Wyszomerski U.S. Pat. No. 3,198,191, Selivanov U.S. Pat. No. 6,016,798, Thoma U.S. Pat. Nos. 7,089,886, 6,976,486, 6,959,669, 6,910,448, and 6,823,820, Costa et al U.S. Pat. No. 6,595,759, Giebeler et al U.S. Pat. Nos. 5,931,153 and 6,164,274, and Archibald et al U.S. Pat. No. 6,596,178 are designed to mix and heat fluids passing through them. A cavitation zone is formed between a rotating cylindrical or other surface and a conforming housing surface, the rotating surface containing numerous cavities. The cavitation effect achieved by the mini-violent turbulence in and around the cavities is known. The Griggs and Hudson et al cavitation devices described in the patents above, in particular, have been used successfully in commerce. However, some fluids are more challenging than others. Many applications require handling dense materials with throughput rates beyond the capabilities of the existing devices and methods.

I have found that the prior art designs and methods do not efficiently account for the fluid properties of the materials to be mixed, or efficiently direct the flow patterns within the devices in many mixing applications.

Combined fluids (a) having high viscosities, and/or (b) that are dense or heavy, and/or (c) that include high concentrations of solids, are often found not to be well mixed using a desired flow rate through the cavitation devices described in the above patents. Prior art devices and methods are not able to overcome the negative effects of viscous drag sometimes even as exerted by fluids having relatively low viscosities. Both the designs of the devices and the methods of using them are wasteful of energy and limit the potential of the cavitation phenomenon as applied to virtually any fluid or combination of fluids to be mixed.

Hudson et al U.S. Pat. No. 6,627,784 in particular introduces the materials to be mixed through two inlet ports directing the flow orthogonal to its rotor and removes it from the center of the single rotor's cylindrical periphery, in an attempt to balance the flow. This construction and method have been found to generate excessive drag, is wasteful of energy, and is incapable of achieving an acceptable mix at high fluid flow rates.

SUMMARY OF THE INVENTION

My technique utilizes two parallel cavitation rotors separated by a space adequate in width to accommodate the incoming fluid and other material(s) to be mixed. In prior devices, such as described in the Hudson et al '784 patent mentioned above, turbulence and drag was generated when the incoming fluid was more or less directed toward the face of the rotor, thus tending to retard rotation. By directing it on the periphery of the housing into a central space between two separate rotors, in one variation also substantially tangential to the housing's internal surface, the viscous drag effect of the incoming material on the side of the rotor is exerted in a positive manner, generally in cooperation with the rotational direction.

When viewed from a face, or end wall, of the housing, the outlet for the mixed fluid may beneficially be placed as much as 360 degrees from the inlet, thus beneficially varying the exposure of the fluid to the cavitation process. Typically, the flow path of the material will be such that it will be transported once through the cavitation zone, although the velocity of the cylindrical surface of the rotor in my invention may be considerably higher than the velocity of the fluid passing through the cavitation zone, thus further enhancing the cavitation effect.

In a variation of the invention, a disc is fixed to the shaft between the two parallel rotors. By also utilizing viscous drag of the incoming material in a positive manner, the disc will also assist in turning the rotors and assuring flow of the fluid into the cavitation zone.

In another variation, radial ribs may be included on the faces of the rotors, on the central disc, or on both.

The invention includes a method of mixing materials comprising introducing the materials to a centrally located peripheral inlet of the dual-rotor cavitation device described above, rotating the rotors to create cavitation in the materials, and removing the mixture thereby created from two side, or lateral, outlets of the cavitation device.

DETAILED DESCRIPTION OF THE INVENTION

Figure 1:
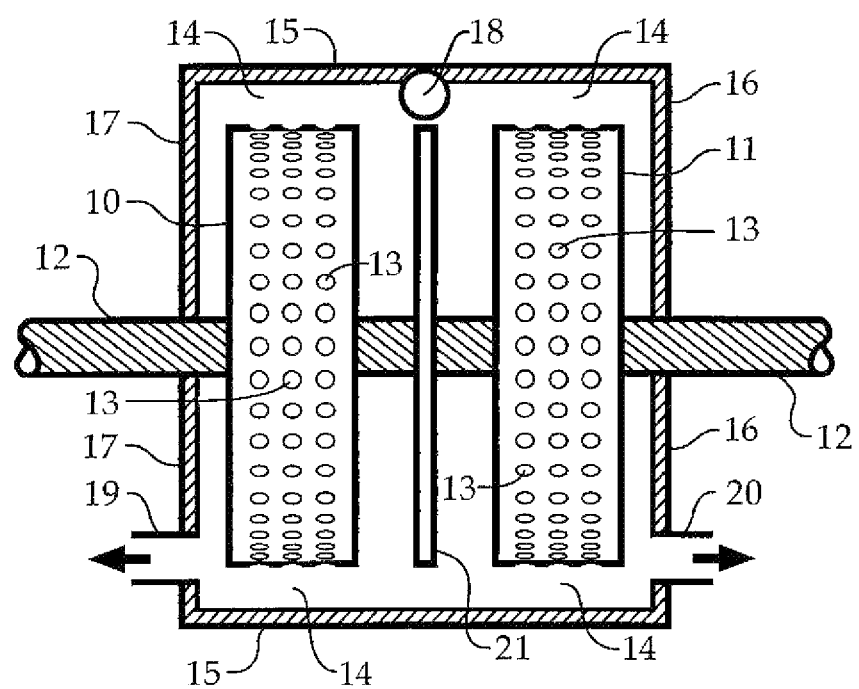
FIG. 1 shows, with portions in section, a basic design of my cavitation device invention including an optional central disc.

Referring now to FIG. 1, rotors 10 and 11 are fixedly mounted on shaft 12. One end of shaft 12 is turned by a motor not shown. Shaft 12 passes through, with appropriate bearings not shown, housing walls (sometimes herein called faces) 16 and 17, depicted as planar, although the exterior may assume other shapes. Together with cylindrical shell 15, housing walls 16 and 17 form a housing for the two rotors 10 and 11. The housing thus formed is sealed except for inlet 18 and outlets 19 and 20. By the term "cylindrical shell" I mean the curved part of the generally cylindrical shape of the housing. It will be understood that the exterior may assume other shapes but it is the interior surface of the cylindrical shell portion of the housing that functions to form the cavitation zones 14.

Rotors 10 and 11 have cavities 13 on their cylindrical surfaces. Rotors 10 and 11 are positioned so that, when turned, they maintain a cavitation zone 14 between the rotors and cylindrical shell 15. Fluid entering through inlet 18, flowing into the cylindrical shell 15, proceeds normally in the same direction the rotors 10 and 11 are turning until it is flung into the cavitation zone 14 (see the more detailed explanation in FIG. 2), ultimately leaving through outlets 19 and 20. The mixed material from outlets 19 and 20 may be combined in a conduit not shown or in a tank not shown; in the case of drilling mud and many other materials, it will ready for immediate use.

Also shown in FIG. 1 is an optional disc 21, fixed to shaft 12 so it will turn with shaft 12 and rotors 10 and 11. Optional disc 21 will exert a positive viscous drag effect on the fluid entering the device through inlet 18, assisting in turning the rotors 10 and 11, thereby further assisting the cavitation process.

As is known in the art, a fluid passing through a cavitation zone such as cavitation zone 14 between the rotating cavitation rotors 10 and 11 and cylindrical wall 15 will be thoroughly mixed. As it moves through the cavitation zone 14, the fluid flows into cavities 13 but is immediately ejected by centrifugal force, creating mini-vacuums in the cavities, which causes the fluid to implode into the cavities, generating heat and thoroughly mixing the ingredients. The process, however, is subject to a number of variables, such as the revolutions per unit of time of the rotor, the size, depth and orientation of the cavities, the velocity of the cylindrical surface of the rotor (which is a function of its diameter), the distance between the surface of the cavitation rotor and the internal cylindrical surface of the housing, the flow rate of the fluid, and the viscosity, density and solids content of the fluid. This list does not exhaust the variables of the structure and operation of the cavitation device, but my invention is designed especially to deal with variables in the fluid which can frustrate the attempts of the operator to obtain a good mix.

Figure 2:
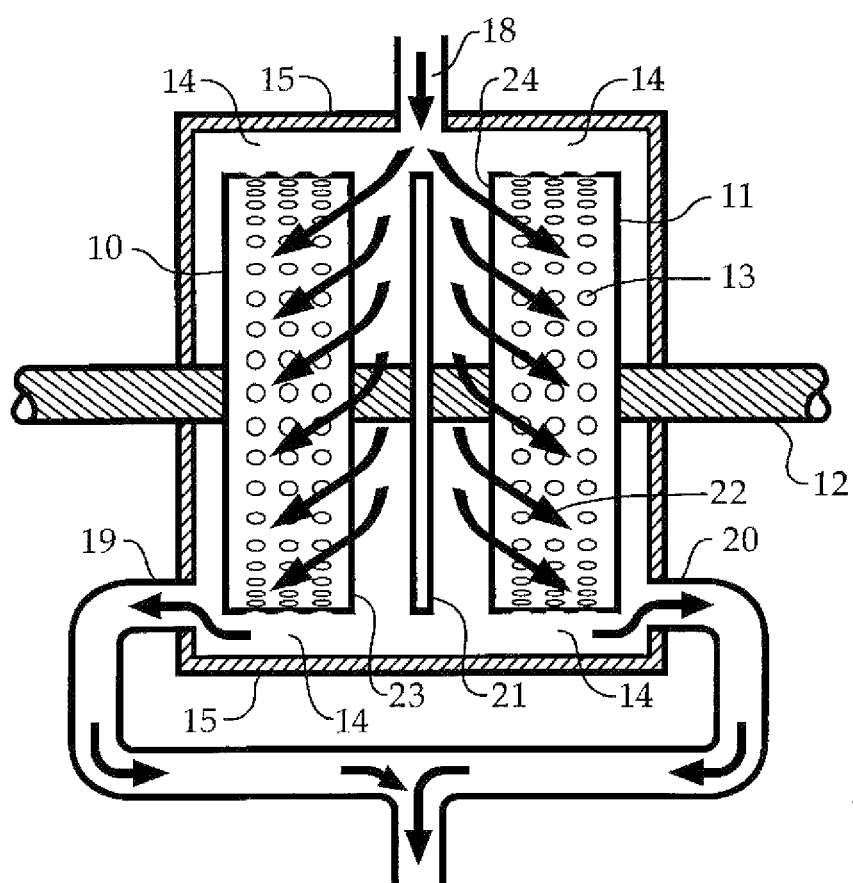
FIG. 2 is also a partially sectional view of the apparatus, especially to illustrate the flow patterns within it.

FIG. 2 is similar to FIG. 1 but is intended to show the flow path of material through the dual rotor cavitation device. As indicated by the arrow in inlet 18, fluid enters through cylindrical shell 15 of the housing centrally to the peripheries of rotors 10 and 11. It is therefore already in a position to move in a beneficial pattern into the cavitation zones 14 of both rotors. As indicated by flow path arrows 22, the fluid first encounters internal faces 23 and 24 of spinning rotors 10 and 11, resulting in a viscous drag effect which assists in directing it to the cavitation zone 14. As indicated by arrows 22, the fluid must pass across the width of the rotors 10 and 11 before passing out through outlets 19 and 20, completing its dual flow path.

Figure 5:
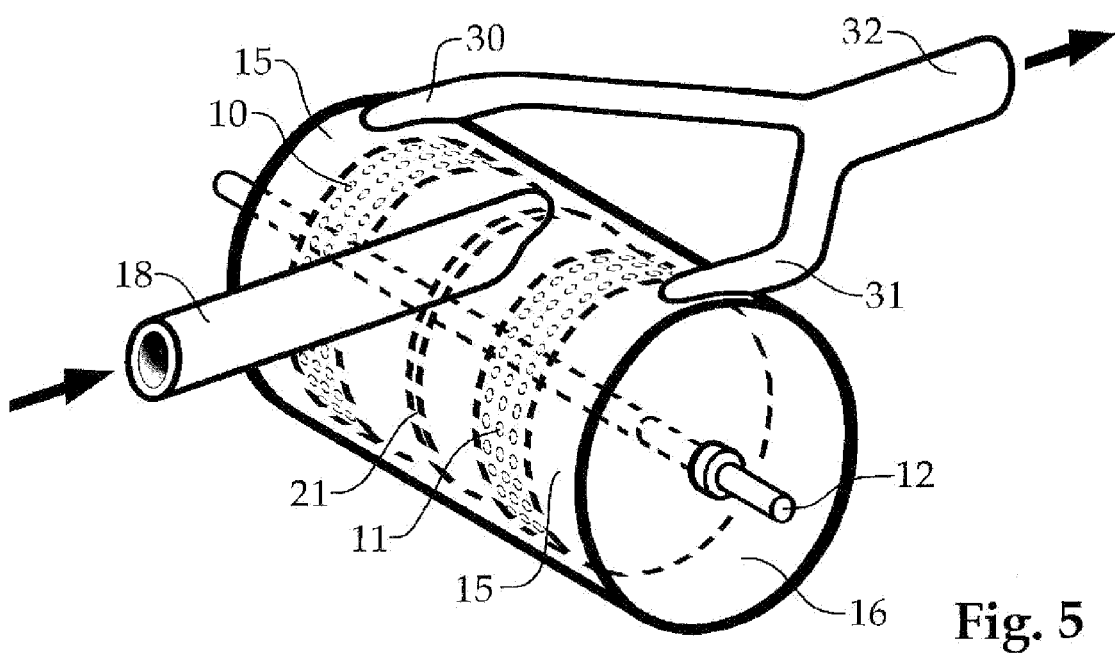
In FIG. 5, a novel configuration of an inlet and two outlets is shown.

In FIG. 2, outlets 19 and 20 are shown as in FIG. 1, placed about 180° from inlet 18 as viewed from a cross section of the cylindrical shell 15. However, the outlets are advantageously placed at other positions in the device, anywhere from 90° to 360° around the periphery of the housing (cylindrical shell 15). Such variations are illustrated in FIGS. 3 and 5.

Figure 3:
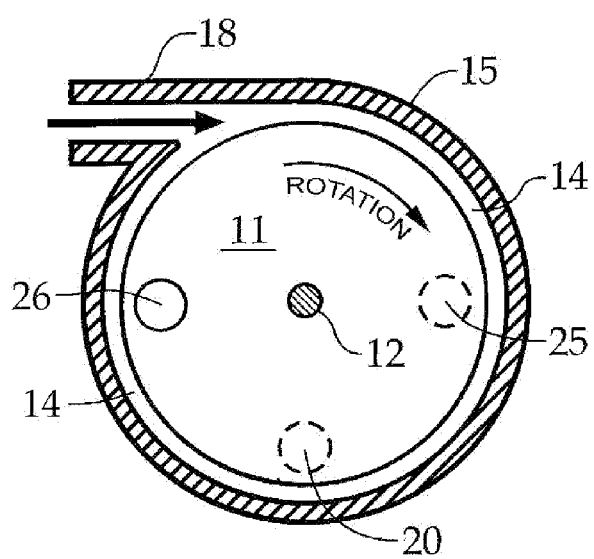
FIG. 3 is a side view of the invention to illustrate tangential feed.

FIG. 3 is a partially sectioned side view of the dual rotor cavitation device, highlighting the central peripheral inlet 18. One of the rotors, rotor 11, mounted on shaft 12, is shown from near the center of the device (face 24 in FIG. 2). Fluid is fed through inlet 18 in the direction of rotation of the rotor 11, as indicated by the arrow labeled "Rotation." The fluid makes contact with the entire face of rotor 11 but is soon moved into cavitation zone 14 where it is subjected to the cavitation process as described above. Outlet 20 is shown as a dotted circle, as it is behind the rotor 11 in this view. However, one purpose of FIG. 3 is to show the positioning of optional alternative outlets 25, shown as a dotted circle about 90° from inlet 18, and outlet 26, shown as a solid circle about 270° on the flow path from inlet 18. Where an outlet is positioned as is outlet 25, a corresponding outlet should be used on the equivalent side of rotor 10. Likewise, outlet 26 would have its corresponding outlet also about 270° from inlet 18. The dual flow paths would thus traverse three-fourths of the internal circumference of the cylindrical shell 15 while also crossing over the widths of both cavitation rotors before being withdrawn. Such pairing of the outlets will help maintain pressure balance in the device but deviations may be made if balance is of little consequence or if there are other ways of compensating.

Figure 4:
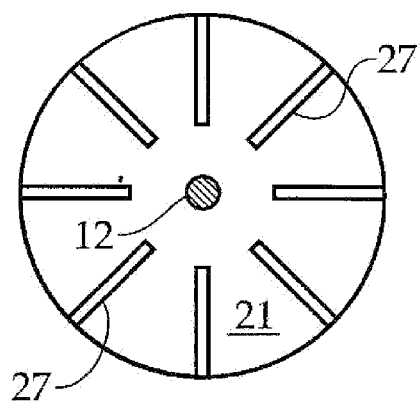
FIG. 4 shows optional radial ribs which may be used on either the rotors or the optional disc or both.

FIG. 4 depicts a side view of the optional disc 21, showing especially optional raised ribs 27. Raised ribs 27 are deployed substantially radially on both surfaces of optional disc 21. Similar raised, radial ribs can be used on the inside surfaces of rotors 10 and 11—that is, on faces 23 and 24 of the rotors, on the interior of the device, as indicated in FIG. 2. Such raised ribs will encourage the centrifugal disposition of the fluid toward the cavitation zone. The ribs may be curved as well as straight as shown.

Comparative Example

The construction of the invention is unique, in one aspect among others, in that it has two cavitation rotors in parallel planes with an open space between them and connected only by the shaft. But the invention includes a novel method also, in that it contemplates feeding the incoming materials to a central point between two separate rotors, on the periphery of the housing, as shown variously in FIGS. 1, 2, 3, and 5. In Table I below, this mode of operation, representing a method of the invention and employing a fluid flow path opposite that of the prior art, is labeled "Peripheral Entry."

The direction of flow described by Hudson et al in U.S. Pat. No. 6,627,784 is determined by introducing the materials to be mixed through inlet ports on the sides, and collecting the mixture from an outlet port in the center of the cylindrical cover of the housing. On entering the device, the fluid impacts the sides of the single monolithic rotor, and is carried, apparently, 180 degrees by the rotor in the direction of its rotation to the downstream, or lower pressure, outlet. This mode of operation is labeled "Orthogonal Entry" in Table I below because the entering fluid directly impacts the sides of the rotor at right angles. It should be noted that the Hudson et al monolithic rotor is built specifically to accommodate the flow pattern generated by its orthogonal entry— their "outlet port" is deliberately "aligned with the void 26" to prevent cavitation damage (column 6, lines 27-28). Void 26 is a portion of the '784 single, monolithic rotor having no cavities. It is not an open space as in the present invention.

A machine constructed as illustrated in the drawings, particularly FIGS. 1 and 2 hereof, but without optional disc 21, having two rotors 10 and 11 each three inches wide and 16 inches in diameter, was used for the comparison to demonstrate superiority of the method invention. The distance between the rotors was 4 inches. The ingredients for a typical heavy oil field drilling mud, having a density of 8.5 pounds per gallon, were fed to the machine and it was operated to mix the ingredients.

The test was run at five different flow rates noted in Table I in barrels per minute. For the "Orthogonal Entry" runs, the material was introduced to outlets 19 and 20 and removed from inlet 18. For the "Peripheral Entry" runs, the material was introduced to inlet 18 and removed through outlets 19 and 20 (FIGS. 1 and 2), as contemplated by the present invention. All runs were conducted on the same machine using the same batch of drilling mud materials. 300 amperes of current were constantly supplied for all runs. Revolutions per minute of the motor, and therefore the two rotors, was recorded, as was the voltage consumed. Tip speed, the velocity of the periphery of the rotors, was calculated from the RPMs. A centrifugal force increase factor g was calculated from the differences in tip speed at each fluid flow rate.

TABLE I

| Barrels/minute | Orthogonal Entry | | | Peripheral Entry | | | Tip Speed Diff., % | Centrif. Force Increase, % g |
|---|---|---|---|---|---|---|---|---|
| | Motor RPM | Voltage | Tip Speed Feet/sec. | Motor RPM | Voltage | Tip Speed Feet/sec. | | |
| 1 | 3200 | 402 | 223.3 | 3233 | 410 | 225.6 | 1.02 | 1.04 |
| 2 | 3050 | 387 | 212.8 | 3202 | 410 | 223.4 | 4.75 | 22.56 |
| 3 | 3034 | 382 | 211.7 | 3200 | 406 | 223.3 | 5.2 | 27.04 |
| 4 | 3016 | 382 | 210.4 | 3200 | 409 | 223.3 | 5.78 | 33.41 |
| 5 | 3013 | 382 | 210.2 | 3190 | 404 | 222.6 | 5.57 | 31.02 |

The amount of time consumed by the mixing operation is very important, as the operators often need a large quantity of drilling fluid on little notice and a fresh mix is superior to one which may have settled somewhat. It is notable, therefore, that the tip speed in the operation of the invention method (Peripheral Entry) was reduced only by three feet per second at 5 bpm compared to 1 bpm, while the orthogonal entry mode resulted in a reduction of 13.1 feet per second. The Orthogonal Entry method exhibited a clearly reduced tip speed as the flow increased. Also it should be noted that for all runs, the Peripheral Entry method consistently drew higher voltages, which is an indicator of higher energy input to the cavitation zone, resulting in consistently better mixed material. The invention method is certainly not limited to a flow rate of 5 barrels per minute or any particular tip speed in combination with a particular fluid flow rate. My invention is beneficial at 1 barrel per minute or less and at flow rates greater than 5 gallons per minute.

The centrifugal force factor has been calculated because centrifugal force increases as the square of the velocity of a point on the periphery of the rotors. The factor "Centrif. Force Increase, % g" in Table I is the square of the increase in tip speed in the Peripheral Entry method as compared to the Orthogonal Entry method for the noted mix flow rate through the unit. Differences in g of 33.41% at 4 barrels per minute and 31.02% at 5 barrels per minute are manifested in much more efficient cavitation at those flow rates and therefore much better mixing.

The invention method thus not only enables significantly greater energy conversion, but also much more efficient cavitation at the challenging flow rates of 4-5 barrels per minute of a drilling fluid.

Referring now to FIG. 5, a housing comprising housing wall 16 and cylindrical shell 15 encloses cavitation rotors 10 and 11 mounted on shaft 12 substantially as in FIGS. 1 and 2. Optional disc 21 is also shown as in FIGS. 1 and 2. Inlet 18 is set to introduce fluid ingredients tangentially and centrally on the periphery of cylindrical shell 15. The fluid will circulate through the cavitation zone 14 (FIGS. 1 and 2) more or less as shown in FIG. 2, but will leave the device through outlets 30 and 31 not on the side walls as in FIG. 2 but also tangential to the periphery of cylindrical shell 15. Outlets 30 and 31 are not only tangential to the curved surface of the housing's cylindrical shell 15, but also may be said to be laterally disposed on cylindrical shell 15, in contrast to the centrally disposed inlet 18. Outlets 30 and 31 may join in a "Y" configuration as shown to form a single outlet 32. The "Y" connection reduces back pressure and turbulence as compared to a "T" connection. A "Y" connection is also beneficial for outlets 19 and 20 in FIGS. 1 and 2.

While the invention has utilized a device having cavitation rotors of 16 inches in diameter and three inches wide, it should be understood that these dimensions can be varied considerably within the scope of the invention. Likewise, in the absence of a disc such as optional disc 21, the distance between the rotors can vary from the width of the inlet to three or four times the width of the inlet depending on the viscosity of the fluid, in order to take advantage of the viscous drag pumping effect on the rotor sides, which helps propel the fluid into the cavitation zone 14. The number of cavities, their depth, their shape, their inclination, and the pattern of their arrays (including the width of the rotors) can be varied considerably within the scope of the invention, as can the distance between the interior surface of the cylindrical housing and the rotors, specifically the height of the cavitation zone 14.

The invention is especially useful for heavy and viscous materials with and without significant solids content. Oil field drilling muds, for example, may vary in density up to 18 pounds per gallon or more while also being quite viscous, and it is with this in mind that the invention has been developed and for which it is known to be especially useful. Oil field fluids (by which I intend to include drilling fluids, fracturing fluids and completion fluids used in gas production) include drilling, fracturing, completion, and other fluids used in the production of hydrocarbons from the earth. The invention is applicable to a wide variety of fluids including for the mixing of polymers, solids, and gases with liquids both aqueous and nonaqueous.

The invention has been described consistently with the rotation of the rotors in the same direction as the flow of the fluid through the device. Nevertheless, it should be understood that the rotors can be operated in the opposite direction—for example, in FIG. 3, the arrow for rotation would be reversed although the fluid flow pattern would be as described.

Also, more than one disc 21 can be used. Two, three, or more such discs can be fixed to shaft 12 to further enhance the efficiency of the unit.

Thus, my invention includes a method of mixing materials comprising introducing materials to be mixed between two cavitation rotors in a housing comprising a cylindrical shell, the cylindrical shell forming a cavitation zone with each of the cavitation rotors, rotating the cavitation rotors to create cavitation in the cavitation zones, and withdrawing the materials so mixed from the housing after they have passed through the cavitation zones. The method is useful, among other purposes, for mixing drilling, fracturing and completion fluids in the recovery of hydrocarbons from the earth.

The invention also includes a method of mixing materials comprising (a) introducing the materials to be mixed to the inlet of a cavitation device, the cavitation device comprising two cavitation rotors mounted in parallel on a shaft and enclosed in a cylindrical housing forming a cavitation zone with the rotors, (b) rotating the rotors to create cavitation in the materials, thereby mixing the materials, and (c) removing the mixture thereby created from the cavitation device through two outlets, wherein the inlet is located centrally and peripherally on the cylindrical housing and the outlets are located laterally on said housing.

Also included in the invention is a cavitation device comprising (a) two cylindrical rotors in parallel planes, the rotors each having a plurality of cavities on its cylindrical surface (b) a sealed housing enclosing rotors, the housing having two end walls and a cylindrical shell positioned to create a cavitation zone between each rotor and the housing when the rotors are rotated, (c) a shaft passing through the housing walls and the rotors for rotating the rotors, (d) an inlet for introducing fluid to the housing, the inlet positioned to inject fluid through the cylindrical shell and between the rotors and (e) two outlets for the fluid, the outlets being positioned at least 200 degrees with respect to said cylindrical shell from the inlet, the outlets positioned also to create flow paths for the fluid through the cavitation zones before reaching the outlets.

The invention claimed is:

1. A cavitation device comprising (a) two cylindrical rotors in parallel planes, said rotors each having a plurality of cavities on its cylindrical surface (b) a sealed housing enclosing rotors, said housing having two end walls and a cylindrical shell positioned to create a cavitation zone between each rotor and said housing when said rotors are rotated, (c) a shaft passing through said housing walls and said rotors for rotating said rotors, (d) an inlet for introducing fluid to said housing, said inlet positioned to inject fluid through said cylindrical shell and between said rotors and (e) two outlets for said fluid, said outlets being positioned at least 200 degrees with respect to said cylindrical shell from said inlet, said outlets positioned also to create flow paths for said fluid through said cavitation zones before reaching said outlets.

2. The cavitation device of claim 1 wherein said two outlets are positioned 360 degrees from said inlet.

3. The cavitation device of claim 1 wherein said inlet is positioned to inject fluid substantially tangentially to said cylindrical shell.

4. The cavitation device of claim 1 wherein and said outlets are positioned to remove fluid substantially tangentially with respect to said cylindrical shell.

5. The cavitation device of claim 1 including at least one disc mounted on said shaft between said rotors.

6. The cavitation device of claim 5 including radial ribs on said at least one disc.

7. The cavitation device of claim 1 including a motor for rotating said shaft.

* * * * *